United States Patent
Meister et al.

(10) Patent No.: US 6,200,609 B1
(45) Date of Patent: Mar. 13, 2001

(54) PROCESS FOR OBTAINING A DEHYDRATED FOOD COMPOSITION CONTAINING LIVE PROBIOTIC LACTIC ACID BACTERIA

(75) Inventors: Niklaus Meister, Grosshoechstetten; Andreas Sutter, Le Mont-S/Lausanne; Martin Vikas, Konolfingen, all of (CH)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 09/242,639

(22) PCT Filed: Sep. 3, 1997

(86) PCT No.: PCT/EP97/04922

§ 371 Date: Feb. 22, 1999

§ 102(e) Date: Feb. 22, 1999

(87) PCT Pub. No.: WO98/10666

PCT Pub. Date: Mar. 19, 1998

(30) Foreign Application Priority Data

Oct. 9, 1996 (EP) .................................. 96202517

(51) Int. Cl.⁷ ...................................... A23C 1/04
(52) U.S. Cl. .................. 426/61; 42/471; 42/491

(58) Field of Search .................................. 426/471, 580, 426/61, 42, 52, 588, 317, 330.2, 334, 455, 456, 490, 491; 435/177

(56) References Cited

U.S. PATENT DOCUMENTS 2,127,524 * 8/1938 Kronberg ............................... 99/203
3,793,465 * 2/1974 Boren .................................... 426/187

FOREIGN PATENT DOCUMENTS 0 063 438 * 10/1982 (EP) .

* cited by examiner

Primary Examiner—Keith D. Hendricks
(74) Attorney, Agent, or Firm—Vogt & O'Donnell, LLP

(57) ABSTRACT

A food composition containing live probiotic lactic acid bacteria is prepared by spraying a food composition containing water from one nozzle and spraying a probiotic lactic acid bacteria culture from a second nozzle into a device into which heated air is introduced for evaporating water from compositions sprayed into the device to dehydrate the compositions for obtaining a dehydrated product from the device and so that the dehydrated product recovered contains live probiotic lactic acid bacteria.

10 Claims, No Drawings

PROCESS FOR OBTAINING A DEHYDRATED FOOD COMPOSITION CONTAINING LIVE PROBIOTIC LACTIC ACID BACTERIA

CROSS REFERENCE TO RELATED PCT APPLICATION

This application is a national stage application of International Patent Application PCT/EP97/04922 filed Sep. 3, 1997.

BACKGROUND OF THE INVENTION

The present invention relates to preparation of a composition containing a dehydrated food composition and live probiotic lactic acid bacteria and particularly to dehydration, and more particularly to dehydration by spray-drying, of a probiotic lactic acid bacteria culture and a food composition for preparation of the dehydrated composition.

The subject of the invention is a new process for the preparation of a dehydrated food composition containing live lactic acid bacteria.

To dry lactic acid bacteria, industry needs to have available processes which are easy to use and which are economical. Spray-drying generally consists in spraying a suspension of lactic acid bacteria in a vessel and under a stream of hot air, the vessel comprising, to this effect, a hot air inlet, an outlet for discharging the air and an outlet for recovering the powder of dried lactic acid bacteria.

U.S. Pat. No. 3,897,307 (Porubcan et al.) describes a process for the preparation of a dehydrated milk-containing food composition comprising live lactic acid bacteria. In this process, the milk is fermented by lactic acid bacteria, ascorbic acid and sodium glutamate are added thereto and then the fermented milk is spray-dried under a stream of hot air. Other methods of preparation of spray-dried fermented milk-containing compositions are also described in U.S. Pat. No. 3,985,901 (C. G. Barberan), IE65390 (Charleville Research Ltd), SU724113 (Kiev Bacterial Prep.) and SU 1,097,253 (Protsishin et al.), for example.

NL 7,413,373 (DSO Pharmachim) describes the preparation of a soya bean-based food composition comprising live lactic acid bacteria, the composition being spray-dried under a stream of hot air.

Likewise, J73008830 (Tokyo Yakult Seizo) describes the preparation of food compositions based on tomato or soya bean and comprising live bacteria or yeasts, the compositions being spray-dried under a stream of hot air.

When a culture of lactic acid bacteria is spray-dried, the sprayed culture is generally subjected to a stream of hot air having a temperature of the order of 100° C. to 180° C., depending on the devices. The drying temperature poses, nonetheless, a few problems. U.S. Pat. No. 3,985,901 (C. G. Barberan) shows indeed that a drying temperature on the order of 180° C. to 300° C. is capable of killing all the live organisms. These observations were also confirmed in EP298605 (Unilever: page 2, lines 43–48), and EP63438 (Scottish Milk Marke: page 1, lines 14–21).

To remedy the destructive influence of the drying temperature, the culture of lactic acid bacteria is generally mixed with protective agents such as vitamins, amino acids, proteins, sugars and/or fats, for example. Unfortunately, the influence of temperature still remains predominant. Only the lactic acid bacteria which are naturally resistant to high temperatures survive a spray-drying sufficiently to make the process economically attractive.

In all the preceding documents, one stream of product is subjected to the spray-drying. There is another way to proceed, which consists in spray-drying conjointly two streams; on one side, the food composition stream and on the other side, the probiotic lactic acid stream. This is the case for disclosures of French Pat. No. 712,791, Swiss Pat. No. 572 568 and U.S. Pat. No. 2,127,524. In these documents, the air inlet temperature never exceeds 100° C., so that there is no problem of survival of the bacteria present.

SUMMARY OF THE INVENTION

The present invention aims to overcome the disadvantages of the prior art by providing a process for drying lactic acid bacteria which is particularly suited to the survival of probiotic lactic acid bacteria, which are moreover known to be particularly sensitive to oxygen and/or heat.

To this effect, the present invention provides a process for drying a food composition in which a food composition and a culture of probiotic lactic acid bacteria are sprayed separately one from the other (described in the remainder of this specification as being sprayed "conjointly" or as being "co-sprayed") under a stream of hot air and in which a dehydrated food composition containing live probiotic lactic acid bacteria is recovered. Further in carrying out the present invention, the culture of lactic acid bacteria and the food composition are sprayed in a spray-drying device with at least two nozzles having a heated air inlet temperature of between 100° C. and 400° C. and an air outlet temperature of between 40° C. and 90° C., the residence time of the lactic acid bacteria in the device being adjusted so as to obtain at least 1% survival of the lactic acid bacteria after drying.

It is found, surprisingly, that the survival of the lactic acid bacteria is substantially improvided when a culture of lactic acid bacteria and another food composition are spray-dried by spraying them separately at the same time and in the same vessel.

Furthermore, it has been observed that acceptable survival of the lactic acid bacteria can be obtained when a culture of lactic acid bacteria and a food composition are dried conjointly in a spray-drying device having an air inlet temperature greater than 200–300° C. It has indeed been observed that depending on the residence time of the droplets in the drying device, the internal temperature of the droplets may not exceed about 40–70° C., because of the cooling caused by the evaporation of water.

DETAILED DESCRIPTIONS OF THE INVENTION

To carry out the present process, a culture of one or more species of probiotic lactic acid bacteria is prepared. Persons skilled in the art are capable of selecting the culture medium which is best suited to the growth of these lactic acid bacteria.

These probiotic lactic acid bacteria may be chosen from the species *Lactococcus lactis*, in particular *L. lactis* subsp. *cremoris* and *L. lactic* subsp. *lactis biovar diacetylactis*: *Streptococcus thermophilus*; the group of acidophilic bacteria consisting of *Lactobacillus acidophilus, Lactobacillus crispatus, Lactobacillus amylovorous, Lactobacillus gallinarum, Lactobacillus gasseri* and *Lactobacillus johnsonii*; *Lactobacillus brevis; Lactobacillus fermentum; Lactobacillus plantarum; Lactobacillus helveticus; Lactobacillus casei* in particular *L. casei* subsp. *casei* and *L. casei* subsp. *rhamnosus; Lactobacillus delbruckii* in particular *L. delbruckii* subsp. *lactis, and L. delbruckii l subsp. bulgaricus*; the bifidobacteria in particular *bifidobacterium infantis, Bifi-*

*dobacterium breve, Bifidobacterium longum*; and finally *Leuconostoc mesenteroides* in particular *L. mesenteroides* subsp. *cremoris*, for example (Bergey's Manual of Systematic Bacteriology, Vol. 2, 1986; Fujisawa et al., Int. Syst. Bact, 42, 487–491, 1992).

However, these probiotic lactic acid bacteria should have the following properties, namely the capacity to adhere to human intestinal cells, to exclude pathogenic bacteria on human intestinal cells, and/or to act on the human immune system by allowing it react more strongly to external aggression (immunomodulatory capacity), for example by increasing the phagocytosis capacities of the granulocytes derived from human blood (J. of Dairy Science, 78, 491–197, 1995; immunomodulatory capacity of the strain La-1 which has been deposited under the treaty of Budapest at the Collection Nationale de Culture de Microorganisme (CNCM), 25 rue due docteur Roux, 75724 Paris, where it was attributed the deposit number CNCM I-1225).

By way of example, the probiotic strain *Lactobacillus acidophilus* CNCM I-1225 described in EP577904 can be used. This strain was recently reclassified among the *Lactobacillus johnsonii* strain, following the new taxonomy, proposed by Fujisawa et al., which is now authoritative as regards the taxonomy of acidophilic lactobacilli (Int. J. Syst. Bact., 42, 487–791, 1992). Other probiotic bacteria are also available, such as those described in EP199535 (Gorback et al.), U.S. Pat. No. 5,296,221 (Mitsuoka et al.), U.S. Pat. No. 556,785 (Institut Pasteur), or U.S. Pat. No. 5,591,428 (Probi AB), for example.

The culture of lactic acid bacteria may comprise, before or after fermentation, at least one protective chemical agent known to improve the survival of lactic acid bacteria during drying and/or during preservation of the powder. Persons skilled in the art have available an abundant literature on these protective agents. To this effect, the protective agents described in patents U.S. Pat. No. 3,897,307, U.S. Pat. No. 4,332,790, J73008830, J57047443, J02086766, J02086767, J02086768, J02086769, J02086770, SU724113, SU 1,097, 253, SU 1,227,145, SU 1,292,706 and SU 1,581,257 are incorporated by reference into the description of the present invention. As a guide, these protective agents may be vitamins such as ascorbidc acid, amino acids or their salts such a lysine, cysteine, glycine and sodium glutamate, proteins or protein hydrolysates which may be obtained from milk or soya bean, sugars such as lactose, trehalose, sucrose, dextrin and maltodextrin, fats in particular butter fat (butter oil), palm fat, groundnut fat, cocoa fat, rapeseed fat or soya bean fat, for example. Finally, these protective agents may be added to the culture in a amount of 0.1 to 80% by weight, for example.

At least 80% by weight of one of the food compositions described hereinafter may be added to the culture of lactic acid bacteria. For the sake of simplicity, it will be considered that this mixture always designates the culture of lactic acid bacteria. It should however be noted that the best survivals obtained after drying are generally linked to the presence of a high cell titre in the culture. The culture of lactic acid bacteria thus preferably contains at least $10^7$ live cell colonies per gram of (referred to herein as "cfu/g") (cfu is the abbreviation for "Colony forming unit"). The choice may also be made to concentrate this culture, for example by centrifugation, so as to increase its live cell titre up to at least $10^8$ cfu/g, preferably $10^8$–$10^{11}$ cfu/g.

Preferably, the food composition which is sprayed conjointly with the culture of lactic acid bacteria is a liquid composition of which at least one of the components is chosen from the group consisting of milk, meat, fish, a fruit and a vegetable, for example, Preferably, the food composition is concentrateed, before it is sprayed, to a water content of up to 70% by weight.

The food composition may comprise a finely divided part, cooked or raw obtained from an edible vegetable, whether this is a seed, root, tuber, stem, leaf, flower or fruit, for example. Among the preferred vegetable, there may be distinguished more particularly leaves, in particular leek, apparatus, fennel and cabbage; stems, in particular rhubarb and broccoli; seeds such as cocoa, pea, soya bean or obtained from cereals; some roots, in particular carrot, onion, radish, celery and beet; tubers, in particular cassava and potato; and fruits, in particular tomato, courgette, aubergine, banana, apple, apricot, melon, water melon, pear, plum, peach, cherry, kiwi fruit, sea buckthorn berry, medlar and mirabelle plum, for example. There may also be used, as plants, higher edible mushrooms, in particular *Agaricus bisporus, Pleurotus ostreatus, Boletus edulis* or *Lentinus edodes*, for example.

The food composition may also comprise a finely divided part, cooked or raw, obtained from an animal, whether it is milk, egg, meat, fish and/or a fraction thereof, in particular a protein fraction and/or a hydrolysate of these proteins, for example. This food composition may thus be a hydrolysed and hypoallergenic cows milk conforming to European Directive 96/4/EC (Official Journal of the European Communities, No. OJ L49/12, 1996), for example.

To carry out the process of the present invention, there may be dried conjointly 1 part of a culture of lactic acid bacteria and at least 1 part of a food composition, in particular 1–1000 parts, the parts being calculated in the dry state, for example.

The spraying-drying devices traditionally used for the industrial manufacture of a milk or coffee powder may be particularly well suited to the needs of the present invention (see Jensen, J. D., Food technology, June. 60–71, 1975). By way of example, the spray-drying devices described in IE65390 (Charleville Res. LTD) and U.S. Pat. No. 4,702,799 (Nestlé) may be easily adapted.

Preferably, these devices have, in operation, a zone at very high temperature (100–400° C.) at the end of at least one of the spray nozzles, it being possible for the zone to represent up to 50% of the volume of the vessel, preferably from 0.1% to 20%, the remainder of the device having a lower temperature which may reach the air outlet temperature, for example. The device described in U.S. Pat. No. 3,065,076 (Nestlé) particularly fulfills these needs.

Preferably, if the heated air inlet temperature is greater than 200° C., these devices also have, in operation, a secondary air inlet. The secondary air inlet temperature is chosen so as to adjust the air temperature at the outlet of the device. The secondary air inlet may be situated near the heated air inlet defined above, for example.

To carry out the present invention, at least one spray nozzle should be provided per composition. In operation, the position of the spray nozzles is not critical. It is thus possible to spray the culture and the food composition in the zone at very high temperature, for example. It is also possible to spray the food composition in the zone at very high temperature, and at the same time to spray the culture in a zone having a lower temperature, for example.

The invention in fact also consists in the appropriate selection of the residence time of the lactic acid bacteria in the drying device. Preferably, the sprayed droplets arrive in a dry form towards the outlet of the device, that is to say at the point where the outlet temperature is 40–90° C., for example. This residence time may be adjusted with the air of the various parameters regulating a spray-drying device, such as the pressure for spraying the droplets, the pressure of the stream of hot air, and/or the distance which the droplets have to cover in the drying chamber, for example. It is not possible to provide precise values for each parameter involved in adjusting the residence time since these parameters and their associated values depend on the type of spray-drying device used. As a guide, the pressure applied at the end of the nozzles spraying the culture or the food composition may be between 5–250 bar and the hot air pressure at the inlet of the device may be between 100 and 200 mbar. Thus, to simplify the definition of this adjustment of the residence time of the culture according to the invention, it will be accepted that this time conforms to the present invention if the rate of survival of the bacteria which have just been dried is at least 1%, persons skilled in the art being indeed capable of selecting the appropriate operating parameters to achieve this result.

Preferably, the residence time of the culture in the drying device is adjusted so as to also obtain a powder having a water activity (Aw) at 25° C. of between 0.05 and 0.5. Indeed, the best rates of survival after drying and during preservation are obtained for a powder having this range of water activity.

Likewise, the best rates of survival after drying and during preservation are obtained when the drying device has at least one of the following conditions, namely, an inlet temperature of 250–400° C., an outlet temperature of 50–75° C., and a culture residence time adjusted so as to obtain at least 10% survival after drying.

Other parameters may also influence the survival of the lactic acid bacteria. Thus, the relative humidity of the air at the outlet of the drying device may be on the order of 10–40%, preferably 20–40%. Furthermore, there may be introduced into the culture of lactic acid bacteria, before the spray nozzle, an inert gas capable of being used in food processes, in particular $CO_2$, nitrogen, argon, helium, alone or in a mixture, for example.

The present process may thus provide a food powder which is easily dispersible, having a density on the order of 200–1000 g/l, having an Aw at 25° C. of the order of 0.05–0.5, having 1 to $10^9$ cfu/g, and exhibiting at least 10% survival of probiotic lactic acid bacteria per year at 20° C. This food powder may be preserved at a temperature of between –20° C. to 40° C. for several months. It can be sold as food which can be rehydrated and consumed directly. It can also be used as ingredient in a more complex food composition, for example.

EXAMPLES

The present invention is described in greater detail below with the aid of the following additional description which provides to examples of drying of cultures of lactic acid bacteria and yeasts. The percentages are given by weight unless otherwise stated. It goes without saying, however, that these examples are given by way of illustration of the subject of the invention and do not in any way constitute a limitation thereto.

Comparative example

This example is designed to show that the spraying of a food composition comprising at least 25% by weight of a culture of probiotic lactic acid bacteria gives less satisfactory survival rates than those obtained in Examples 1 to 3 when a culture of probiotic bacteria and a food composition are co-sprayed.

For that, 3% of a fresh preculture, in an MRS medium, of the *Lactobacillus johnsonii* CNCM I-1225 strain is mixed with sterile MSK medium comprising 10% reconstituted powdered skimmed milk, 0.1% commercial yeast extract, 0.5% peptone and 0.1% Tween 80, then it is fermented for 8 hours at 40° C., without mixing.

A large-scale culture of this strain is then prepared by fermenting a medium comprising 3% lactose, 0.5% of a commercial yeast extract, 0.1% hydrolysed whey, 0.5% peptone and 0.1% Tween 80, with 3% of the above fermented mixture, at 40° C., until a pH of 5.5 is obtained, with mixing at 30 revolutions per min. and under a $CO_2$ atmosphere. The fermentation of the mixture at pH 5.5 is continued for a few hours by controlled additions of an alkaline base. The culture is cooled to 15–20° C., it is concentrated by centrifugation so as to obtain about 10% dry matter and $10^{10}$ cfu/g, then it is supplemented with 2% by weight of ascorbic acid, 1.25% by weight of sodium glutamate, and 300% by weight of concentrated milk having 50% by weight of dry matter.

The culture is spray-dried with the operating conditions described in Table 1 below and in a device adapted from that described in FIG. 1.c of U.S. Pat. No. 3,065,076. The only difference being that no agglomerating device is used; the powder which went into the dust recovering device attached to the dryer is recycled into the vessel; secondary air having a temperature of 18–30° C. (depending on the room temperature) is injected near the heated air inlet by means of a mere opening of the vessel to the external medium; and $CO_2$ and/or nitrogen is injected into the culture just before it is sprayed. After spraying, the powder is recovered on a fluidized bed passing through 3 compartments, the first two compartments serving to further dry the powder at temperatures of 60–90° C., and the last compartment serving to cool the powder to about 30° C. Finally, the number of colonies of lactic acid bacteria which survived the drying is determined. The results are presented in the accompanying Table 1 below.

EXAMPLES 1–3

Milk and a culture of the *Lactobacillus johnsonii* CNCM I-1225 strain are spray-dried conjointly. For that, a bacterial culture is prepared as described in the comparative example, protective agents are added thereto and 1 part of this culture of bacteria is continuously co-sprayed with about 40 to 100 parts of concentrated milk having 50% dry matter, the said spraying being carried out conjointly in devices adapted from that described in FIG. 1.c of U.S. Pat. No. 3,065,076.

After spraying, the powder is recovered on a fluidized bed passing through 3 compartments, the first two compartments serving to further dry the powder at temperatures of 60–90° C., and the last compartment serving to cool the powder to about 30° C. The number of surviving bacteria in the dehydrated food powder is then counted, taking into account the dilution made with milk. The results are presented in Table 2 below. The various powders exhibits, in addition, very good stabilities over time, more than 10% of the lactic acid bacteria surviving indeed after storing at 20° C. for 1 year under a carbon dioxide atmosphere. It can also be noted that the Aw at 25° C. of these food powders is always between 0.05 and 0.5.

In Example 1, two sprayings are carried out conjointly in the device represented in FIG. 1.c of U.S. Pat. No. 3,065, 076, the only difference being that no agglomerating device is used. The powder which went into the dust recovering device is recycled into the vessel. The secondary air having a temperature of 18–30° C. (depending on the room temperature) is injected near the heated air inlet by means of a mere opening of the vessel to the external medium. $CO_2$ is injected into the culture just before it is sprayed, and the culture and the milk are sprayed conjointly with the aid of two nozzles whose ends are placed, in the vessel, at the level of the heated air inlet (same position as nozzle 14 of FIG. 1.c of U.S. Pat. No. 3,065,076). The operating conditions are described in the Table.

In examples 2–3, the two sprayings are carried out conjointly in the device represented in FIG. 1.c of U.S. Pat. No. 3,065,076, the only difference being that no agglomerating device is used. The powder which went into the dust recovering device is recycled in the vessel, the entry of the recycled powder taking place at the half-way height of the vessel; the secondary air having a temperature of 18–30° C. (depending on the room temperature), is injected near the heated air inlet by means of a mere opening of the vessel to the external medium; and the milk is sprayed with the aid of a nozzle whose end is placed, in the vessel, at the level of the axis and of the end of the heated air inlet (same position as nozzle 14 of FIG. 1.c of U.S. Pat. No. 3,065,076). Simultaneously, the bacterial culture is sprayed with the aid of a nozzle whose end is placed, in the vessel, at the level of the axis and of the end of the recycled powder inlet. The operating conditions are described in the Table.

EXAMPLE 4

A culture of lactic acid bacteria CNCM I-1225 comprising 5% ascorbic acid and 5% trehalose, and a finely divided concentrated tomato juice having 50% dry matter are sprayed conjointly under the conditions described in Example 2.

EXAMPLE 5

A culture of lactic acid bacteria CNCM I-1225 comprising 5% ascorbic acid and 5% trehalose, and a soya bean-based vegetable milk having 50% dry matter are sprayed conjointly under the conditions described in Example 2.

What is claimed is:

1. In a process wherein a composition containing water is sprayed into a spray-drying device and wherein air is introduced into the device at a temperature to evaporate water from and dehydrate the composition sprayed in the device and wherein air is let out of the device and wherein a dehydrated composition is obtained from the device, the improvements comprising:

spraying a food composition containing water from one nozzle into the device and spraying a probiotic lactic acid bacteria culture from a second nozzle into the device and introducing air into the device which is heated and has a temperature of between 100° C. and 400° C. and introducing air in addition to the heated air into a zone in the device so that the air let out of the

TABLE 1

| Operating conditions | Comparative example | Example 1 | Example 2 | Example 3 |
|---|---|---|---|---|
| Bacterial culture | | | | |
| Protective agents | *Milk + A + SG | *M + A + T | *M + A + SG | *M + A + T |
| % Dry matter | 41.82 | 31.08 | 28.79 | 31.08 |
| pH | 6.3 | 6.15 | 6.48 | 6.15 |
| Gas (l/min) | 6.5($CO_2$) | 2.5($CO_2$) | — | — |
| Flow rate (l/h) | 496.3 | 78 | 30 | 53 |
| Spraying pressure (bar) | 59 | 70 | 8 (nozzles with two phases: $N_2$) | 8 (nozzles with two phases: $N_2$) |
| Milk | | | | |
| % Dry matter | — | 46.88 | 46.88 | 46.88 |
| Flow rate (kg/h) | — | 378 | 556 | 420 |
| Spraying pressure (bar) | — | 30 | 48 | 38 |
| Air at inlet (° C.) | 310 | 309 | 310 | 305 |
| Hot air pressure (mbar) | 190 | 164 | 190 | 160 |
| Air at outlet (° C.) | 65 | 65 | 64 | 65 |
| Humidity of the air at outlet (%) | 20.7 | 20 | 24.2 | 20.6 |
| Humidity of the powder (%) | 3.3 | 3.5 | 3.8 | 4.0 |
| Powder yield (kg/h) | 215 | 209 | 280 | 220 |
| Density of the powder (g/l) | 440 | 535 | 335 | 320 |
| Cfu/ml before spraying | $1.2 \times 10^{10}$ | $4.45 \times 10^9$ | $9.63 \times 10^9$ | $5.81 \times 10^9$ |
| Cfu/g after spraying | $5.3 \times 10^6$ | $6 \times 10^7$ | $6.5 \times 10^7$ | $8.2 \times 10^7$ |
| Loss of viability (log cfu/g) | 3.72 | 1.42 | 1.19 | 1.23 |
| Viability after drying (%) | <0.1 | 3.8 | 6.45 | 5.88 |

Legend
*Milk + A + SG: 300% concentrated milk having 50% dry matter + 2% ascorbic acid + 1.25% sodium glutamate
*M + A + SG: 100% concentrated milk having 50% dry matter + 2% ascorbic acid + 1.25% sodium glutamate
*M + A + T: 100% concentrated milk having 50% dry matter + 5% ascorbic acid + 5% trehalose device has a temperature of between 40° and 90° C. and so that, in the device, water is evaporated from spray droplets of the sprayed food composition and from spray droplets of the sprayed bacteria culture to dehydrate the food composition and the bacteria of the culture and so that an internal temperature of the bacteria spray droplets does not exceed about 70° C. so that a dehydrated product in obtained from the device which contains dehydrated probiotic bacteria and in which at least 1% of the bacteria are live bacteria.

2. In a process according to claim 1 wherein the heated air introduced into the device has a temperature of between 200° C. and 400° C.

3. In a process according to claim 1 or 2 wherein the air introduced into the device which is in addition to the heated air has a temperature of from 18° C. to 30° C.

4. In a process according to claim 1 wherein the food composition and bacteria culture are dehydrated in the device so that the dehydrated product recovered has, at 25° C., an $A_W$ of between 0.05 and 0.5.

5. In a process according to claim 1 wherein the improvements further comprise further drying the dehydrated product in a fluidized bed.

6. In a process according to claim 1 wherein the bacteria culture medium comprises bacteria in an amount of at least $10^7$ cfu/g.

7. In a process according to claim 1 wherein the bacteria culture medium contains the bacteria in an amount of at least $10^8$ cfu/g.

8. In a process according to claim 1 or 6 wherein the food composition to be sprayed has a water content of at least 70% by weight.

9. In a process according to claim 1 wherein, in parts calculated in a dry state, at least one part the food composition is sprayed into the device per part of bacteria culture sprayed into the device.

10. In a process according to claim 8 wherein, in parts calculated in a dry state, at least one part of the food composition is sprayed into the device per part of bacteria culture sprayed into the device.

* * * * *